United States Patent [19]

Wells

[11] Patent Number: 4,687,440
[45] Date of Patent: Aug. 18, 1987

[54] APPARATUS FOR HEATING CHARGING MATERIAL

[75] Inventor: William Wells, Sao Paulo, Brazil

[73] Assignee: Kortec AG, Zug, Switzerland

[21] Appl. No.: 902,443

[22] PCT Filed: Dec. 2, 1985

[86] PCT No.: PCT/EP85/00656
§ 371 Date: Aug. 5, 1986
§ 102(e) Date: Aug. 5, 1986

[87] PCT Pub. No.: WO86/03783
PCT Pub. Date: Jul. 3, 1986

[30] Foreign Application Priority Data

Dec. 22, 1984 [DE] Fed. Rep. of Germany ....... 3447267

[51] Int. Cl.[4] .............................................. F72B 7/00
[52] U.S. Cl. ..................... 432/194; 34/218; 266/901; 432/14; 432/17
[58] Field of Search ................. 266/901; 432/14, 17, 432/121, 159, 194; 34/22, 28, 33, 218; 75/10.38

[56] References Cited

U.S. PATENT DOCUMENTS

| 3,645,516 | 2/1972 | Turpin et al. | 432/17 |
| 3,832,128 | 8/1974 | Paul | 432/17 |
| 4,255,131 | 3/1981 | Johnson, Jr. | 432/14 |

FOREIGN PATENT DOCUMENTS 2071290 9/1981 United Kingdom .

Primary Examiner—Edward G. Favors

[57] ABSTRACT

In order to be able to heat the charging material (3) of a charging material preheater (1) in a more uniform fashion and to higher temperatures, while enjoying short flow paths, the charging material preheater (1) is in the form of a container (2) having a bottom opening (4) which can be closed by an axially displaceable hollow cylinder (13), the interior of the container is subdivided by a grid (6) which falls away in an inclined configuration towards the bottom opening (4), into a receiving space (7) for the charging material and a free lower annular space (8) into which opens an opening (9) for the heating gas, and the hollow cylinder (13) is incorporated into the flow path, by way of gas orifices (16, 17). In addition the heating gases are passed through the charging material (3) alternately in opposite directions.

10 Claims, 2 Drawing Figures

APPARATUS FOR HEATING CHARGING MATERIAL

DESCRIPTION

1. Technical Field

The invention relates to an apparatus for heating charging material, in particular metal scrap, by a heating gas, in particular hot waste gas from a smelting or refining unit, comprising a charging material pre-heater in the form of a container for receiving the charging material to be heated up, which has a closable bottom opening for emptying the container, a removable cover for introducing the charging material into the container and a lower and an upper opening for introducing and removing the heating gas, wherein the interior of the container is divided by a grid which falls away in an inclined position towards the bottom opening, into a receiving space for the charging material and a free lower annular space into which the lower opening for the heating gas opens.

2. Background Art

In apparatuses of the above-indicated kind, there is the problem of preventing local overheating of the charging material which is to be heated up. When using light scrap such as steel turnings, local overheating can result in the charging material catching fire.

U.S. Pat. No. 2,805,143 discloses recycling a portion of the heating gas which has passed through the charging material preheater and cooled down in heat exchange relationship with the charging material, and mixing it with the hot gas at the intake side of the charging material preheater. That procedure reduces the temperature of the gas so that overheating of the charging material can no longer occur. However, when the temperature of the heating gas which is introduced into the charging material preheater is reduced, the heating time is increased in length, together with a reduction in the mean temperature to which the charging material in the charging material preheater can be heated.

German published specification (DE-AS) No. 23 02 012 discloses a process for preheating scrap by heating it with combustion gases in at least two heat-insulated containers, wherein the combustion gases are generated under the heating cover of the first container and are then passed through the further containers which are disposed downstream thereof; in that process, in the periodic feeding of a container, the heating gas is alternately supplied from above and from below. In the last heating stage, that is to say, before the container is passed to the smelting furnace, heating gas only ever passes therethrough in one direction so that, in relation to long flow paths, a substantial temperature difference between the heating gas intake side and discharge side is inevitable.

In the apparatus disclosed in German laid-open application (DE-OS) No. 30 38 515, the attempt is made to provide for uniform heating of all the material which is to be heated up, and a reduction in pressure drops, by virtue of the hot gases being passed through the charging material in such a way that the gases are distributed over the cross-section thereof. For that purpose, provided at the inner periphery of the charging material preheater, at uniform peripheral spacings, is a plurality of passages extending in a vertical direction, which each have orifices for communicating the passages with the interior of the preheater in a radial direction, while there is a vertical passage in the middle of the preheater. Although that arrangement provides that the intake cross-section for the hot gases may be substantially increased and it is possible to achieve short flow paths thereby reducing the danger of local overheating phenomena, that however suffers from the following difficulties. For the purposes of forming the vertical passage in the middle of the charging material preheater, a core member is fitted into the container before the charging material is introduced, which core member is removed again after the introduction of the charging material. In that case, particularly when using small scrap, pieces can fall into the vertical passage formed by the core member and partly block it off. In that case there is no longer any guarantee that the gas will flow uniformly through the charging material.

In the apparatus disclosed in German laid-open application (DE-OS) No. 31 07 548, as set forth in the classifying portion of claim 1, the interior of the container of the charging material preheater is subdivided by a grid which falls away in an inclined position towards the bottom opening, into a receiving space for the charging material and into a free lower annular space which is connected to a heating gas conduit for feeding the heating gas thereto. The bottom opening is closed by two flaps which can be pivoted away and which are also formed as gas-pervious grids. In that apparatus the edge region of the charging material in the charging material preheater is heated to a greater degree than the central region, and the design no longer guarantees short flow paths in respect of the central region. It is also necessary for the charging material preheater to be set down on a support foundation, by means of a lifting apparatus, prior to the operation of introducing the charging material, in order thereby to ensure that the bottom closure which is formed by the pivotally openable grids is not subjected to an excessive mechanical loading by virtue of the downwardly falling charging material impinging thereon.

DISCLOSURE OF INVENTION

The object of the present invention is to provide an apparatus of the kind set forth in the classifying portion of claim 1, which, while being of a simple construction and easy to operate, permits uniform heating of the charging material to a higher means temperature value, without local overheating. The invention seeks to ensure a uniform flow of gas through the charging material in the preheater, with short flow paths. The invention further seeks to provide that the bottom closure is such that, without additional measures, it can withstand the impingement thereon of the downwardly falling charging material, when the container is being charged therewith. The invention also seeks to make it possible, by means of simple additional steps, for the region of the charging material at the gas discharge side to be heated to the same temperature as at the gas intake side so that the charging material contained in the preheater can be heated up even more uniformly and to an even higher mean temperature value, without local overheating. Finally, the invention seeks to provide that it is possible to achieve simple temperature control in respect of the heating gas, when using hot waste gases from a smelting unit or the like as the heating gas.

The apparatus according to the invention is characterised by the features recited in claim 1. Advantageous embodiments of the invention are set forth in the other claims.

In the apparatus according to the invention, a hollow cylinder which can be raised and lowered and which is of the configuration corresponding to the features set forth in claim 1 forms, in the container, an annular receiving space for the charging material to be heated, and the fact that the hollow cylinder is incorporated into the heating gas flow path guarantees short flow paths and a uniform flow of gas through the charging material. Formed in the container which is filled with charging material, by means of a grid which drops away in an inclined configuration and the hollow cylinder which can be raised and lowered, are a lower and an upper free annular space into which respectively open a lower opening and an upper opening for introducing and removing the heating gas. In accordance with a development of the invention, a heating gas conduit can be selectively connected to the lower or the upper opening and the respective other opening can be communicated with a waste gas conduit. That arrangement provides a further improvement in regard to the aim that the invention seeks to achieve, of heating up the charging material contained in the preheater in a more uniform fashion and to a higher mean temperature value without local overheating. More specifically, by periodically reversing the direction of flow at suitable intervals of time, preferably at intervals of about 5 minutes, the intake side and the discharge side of the hot gases which flow through the charging material can be interchanged so that the charging material can be heated to a uniformly high temperature in both regions, without local overheating. When use is made of the hot waste gases from a smelting or refining unit, heating of the charging material may be controlled in the optimum fashion if the waste gases are passed by way of a processing chamber in which they are heated or cooled for the purposes of temperature control, before being passed through the charging material.

BRIEF DESCRIPTION OF DRAWINGS

The invention will now be described in greater detail by means of an embodiment with reference to two Figures of drawings in which.

MODE FOR CARRYING OUT THE INVENTION

Figure 1:
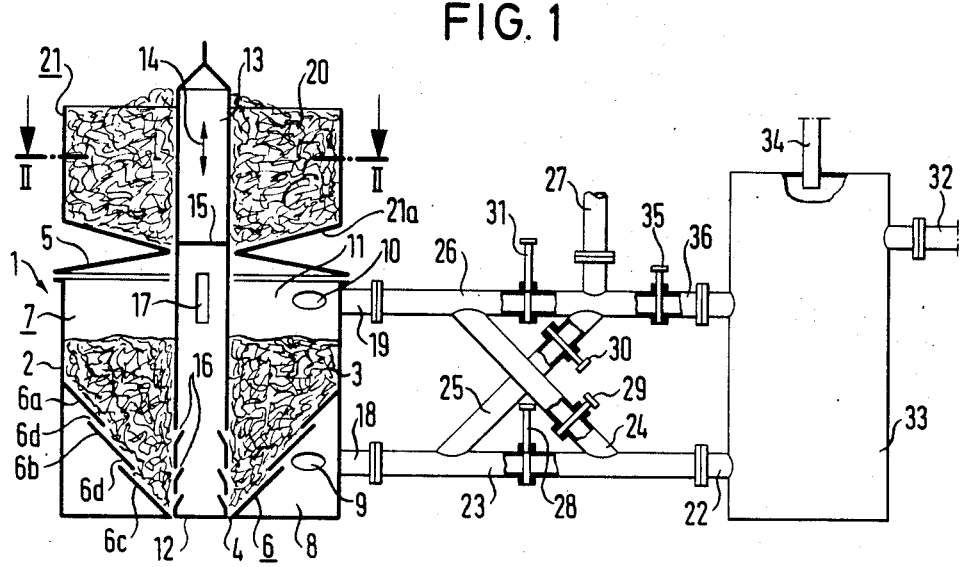
FIG. 1 is a diagrammatic partly sectional side view of an apparatus according to the invention.

The apparatus illustrated in FIG. 1 includes a charging material preheater 1 in the form of a container 2 for receiving the charging material 3 which is to be heated up by means of a heating gas. The charging material is preferably steel scrap which is to be charged into a smelting furnace (not shown) and smelted therein. The waste gases from the smelting furnace are preferably used as the heating gases.

Figure 2:
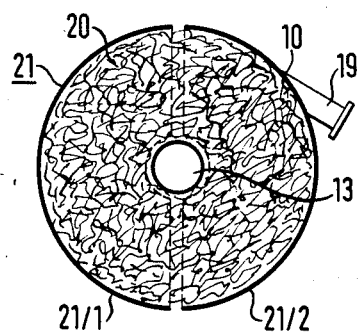
FIG. 2 is a view in section taken along line II—II in FIG. 1.

The container 2 of the charging material preheater 1 which, in the illustrated embodiment as shown in FIG. 2, is round in cross-section, includes a closable bottom opening 4 for the purposes of emptying the container 2, as well as a removable cover 5 for introducing the charging material into the container 2. The interior of the container is divided by a grid 6 which falls away in an inclined configuration towards the bottom opening 4, into a receiving space 7 for the charging material and a free lower annular space 8 into which a lower opening 9 for the heating gas opens. An upper opening 10 for the heating gas communicates with the receiving space 7, more specifically an upper annular space 11 which is formed between the charging material 3 and the cover 5 and which forms a part of the receiving space 7.

Disposed at a central position in the container 2 is an axially displaceable hollow cylinder 13 which passes through the cover 5 and which is closed at its lower end by a lower closure plate 12. As shown in FIG. 1, the hollow cylinder 13 closes the bottom opening 4 in the lowered position thereof while in its raised position it opens the bottom opening for the purposes of emptying the container 2. The upward and downward movement of the hollow cylinder 13 is indicated by the double-headed arrow 14.

The hollow cylinder 13 is not only closed by a lower closure plate 12 at its lower end, but also by an upper closure plate 15 which is disposed in the upper region thereof. As will be described hereinafter, that arrangement makes it possible for the hollow cylinder to be utilised for carrying the heating gas and for the flow path of the heating gas through the charging material to be reduced in length. For that purpose, in its lower region the displaceable hollow cylinder has a plurality of gas orifices 16 which are distributed around its periphery, while in the region of the upper annular space 11 it has at least one gas through-flow opening 17. Preferably, the hollow cylinder has a plurality of such gas through-flow openings 17, distributed over its periphery.

The grid 6 is formed by downwardly tapering annular members 6a, 6b and 6c. In regard to adjacent annular members such as the annular members 6b and 6c, the inner edge region of the outer annular member 6b overlaps the outer edge region of the inner annular member 6c and is disposed at a spacing from and above the outer edge region of the inner annular member 6c, thereby forming an annular gap 6d. That arrangement ensures that no pieces of the charging material become caught in the annular gaps 6d. The gas orifices 16 are also of such a configuration that the respective opening of each thereof is screened from the flow of material in the receiving space 7 of the container 2, by the respective edge disposed above that opening. As the situation which is being dealt with here involves a container which is of a round cross-section, the annular members 6a, 6b and 6c are in the form of frustoconical surfaces; they each need to extend only over a respective portion of the periphery. Moreover, the grid 6 may also be of a different construction. The important consideration is that the gas is introduced into or removed from the charging material in as uniform a fashion as possible. That aim is also served by the tangential arrangement of the connections 18 and 19 for the heating gas, which are provided on the container 2, at the lower opening 9 and the upper opening 10 respectively of the container (see FIG. 2). Disposed above the cover 5 of the container 2 is a supply container 21 for accommodating a charge 20. The bottom 21a of the supply container 21 is formed in one piece with the cover 5 of the container 2, that is to say, at the same time the bottom 21a forms the cover of the container 2. Moreover, as shown in FIG. 2, the cover and the supply container are subdivided into two horizontally displaceable portions 21/1 and 21/2. By displacing the portions 21/1 and 21/2 from the position shown in FIGS. 1 and 2, towards the right and towards the left, the charge 20 in the supply container 21 may be conveyed into the container 2. In order to facilitate that operation, the bottom 21a of the supply container 21 is of such a configuration that it drops away in an inclined fashion towards the centre. Moreover, the hollow cylinder 13 also passes through the supply container 21, as can be seen from FIG. 1. The supply container 21 is open upwardly.

The following features are provided so that the heating gas can be passed alternately in opposite directions through the charging material. A heating gas conduit 22 for carrying the heating gas is connected by way of a first pipe portion 23 to the lower opening 9 and by way of a second pipe portion 24 to the upper opening 10 of the container 2. In addition, a waste gas conduit 27 is connected by way of a third pipe portion 25 to the lower opening 9 of the container 2, and by way of a fourth pipe portion 26 to the upper opening 10 of the container 2. Each of the pipe portions 23 through 26 can be opened or closed, in regard to a flow of gas therethrough, by a respective slider 28 through 31. In the position shown in FIG. 1, the sliders 28 and 31 are opened and the sliders 29 and 30 are closed.

Usually, the heating gas used is formed by the waste gas from a smelting or refining unit. In that case it may be desired to control the temperature and the composition of the gas. In the apparatus shown in FIG. 1, that is effected by the hot waste gas which is supplied by way of a conduit 32 from the smelting or refining unit being passed to the scrap preheater 1 not directly but by way of a processing chamber 33 into which opens a nozzle 34 which preferably comprises a plurality of concentric pipes and which serves as a burner, for introducing oxygen or a cooling gas. The heating gas which is adjusted to the desired temperature in the chamber 33 leaves the chamber 33 by way of the heating gas conduit 22. The processing chamber 33 is also connected to the waste gas conduit 27 by way of a gas outlet 36 which can be closed off by a slider 35.

Various modes of operation of the above-described apparatus will now be described.

In the method step shown in FIG. 1, the sliders 28 and 31 in the conduit portions 23 and 26 are opened and the sliders 29 and 30 in the conduit portions 24 and 25 are closed. The slider 35 is also closed. The heating gas which is supplied tangentially by way of the heating gas conduit 22 flows tangentially into the free lower annular space 8 and from there through the annular gaps 6d into the charging material 3. A part of the heating gas which is introduced into the material in that way flows through the charging material 3 substantially in a radial direction, in the lower region of the receiving space 7, and passes through the gas orifices 16 into the hollow cylinder 13 from where it passes by way of the upper gas through-flow opening 17 into the upper annular space 11 formed between the charging material and the cover 5. A further portion of the heating gas introduced into the charging material 3 flows upwardly from below through the charging material and passes directly into the upper annular space 11. When it flows through the charging material 3, the heating gas continuously gives off its sensible heat and is then removed from the upper annular space 11, by way of the upper opening 10, through the waste gas conduit 27. By virtue of the continuous output of heat, the charging material 3 is heated to a greater degree at the heating gas intake side than at the discharge side.

Before local overheating occurs in the region of the intake side of the charging material, the heating gas is passed through the charging material in the opposite direction by closure of the sliders 28 and 31 and opening of the sliders 29 and 30 so that the maximum amount of thermal energy is now supplied to the regions which were heated up to the lowest degree in the preceding step. By repeatedly periodically switching over the direction of gas flow in that way, it is possible for almost the entire charging material 3 to be heated up to a higher mean temperature than in the known processes, without the risk of overheating.

When the prescribed temperature is reached, all the sliders 28 through 31 are then closed and the slider 35 is opened, and the heated charging material 3 is emptied into a truck or transportable container therebelow, by raising the hollow cylinder 13. Then, by lowering the hollow cylinder 13, the bottom opening 4 of the container 2 is closed again and the next charge 20 is emptied from the supply container 21 into the container 2, by drawing the halves 21/1 and 21/2 apart. After the two horizontally displaceable portions 21/1 and 21/2 have been brought back together again, it is possible to begin with the procedure of heating up the charging material 3 which has been introduced into the container 2 and the next charge 20 can be introduced into the supply container 21, during the heating process.

The processing chamber 33 and the nozzle 34 make it possible for the temperature and composition of the heating gas which is fed to the charging material preheater 1 to be controlled in the desired fashion. If for example the temperature of the waste gas which is supplied by way of the conduit 32 from a smelting furnace or the like is excessively low, then further energy can be supplied by way of the burner 34 so that the temperature of the heating gas can be increased. If the gas which is introduced into the processing chamber 33 by way of the conduit 32 still contains combustible constituents, then they may be burnt by introducing oxygen or air by way of the nozzle 34, thus being utilised in order to save energy. If the temperature of the gas which is supplied by way of the conduit 32 is excessively high, then it can be reduced in the desired fashion by introducing cooling gas through the nozzle 34. Cooling air may be used as the cooling gas if the gas which is to be cooled down does not have any combustible constituents or only an immaterial amount thereof.

What is claimed is:

1. An apparatus for heating charging material, in particular metal scrap, by a heating gas, in particular hot waste gas from a smelting or refining unit, comprising: a charging material preheater in the form of a container for receiving the charging material to be heated up, said container having a closable bottom opening for emptying the container, a removable cover for introducing the charging material into the container, and a lower and an upper opening for introducing and removing the heating gas respectively, a grid inclined towards the bottom opening and dividing the container into a receiving space for the charging material and a free lower annular space into which the lower opening for the heating gas opens, said container being a hollow cylinder which passes through the cover and which is closed at a lower end thereof and in an upper region thereof; said hollow cylinder being displaceable to a raised and a lowered position and vice versa, in lowered position said cylinder closing the bottom opening and in raised position opening the bottom opening for emptying the container, the upper opening for the heating gas opening into an upper annular space formed between the charging material and the cover, said hollow cylinder having in the lower region a plurality of peripherally distributed gas orifices and, in the region of the upper annular space, at least one gas through-flow opening.

2. An apparatus according to claim 1, wherein the grid is formed by downwardly tapering annular members, wherein in respect of adjacent annular members a respective inner edge region of an outer annular member overlaps the outer edge region of the inner annular member and is disposed at a spacing from and above the outer edge region of the inner annular member, thereby forming an annular gap.

3. An apparatus according to claim 2, wherein the container is of round cross-section, and the annular members are fructoconical.

4. An apparatus according to claim 1, comprising a supply container for accommodating a charge, arranged above the cover.

5. An apparatus according to claim 4, wherein said displaceable hollow cylinder passes through the supply container.

6. An apparatus according to claim 4 or 5, wherein the cover forms a part of the bottom of the supply container.

7. An apparatus according to claim 6, wherein the cover and the supply container are subdivided into two horizontally displaceable portions.

8. An apparatus according to any one of claims 1 to 3, comprising a heating gas conduit to be selectively connected to one of the lower and upper opening of the charging material preheater, and a waste gas conduit to be connected to the respective other lower and upper opening of the charging material preheater.

9. An apparatus according to claim 8, wherein the heating gas conduit passes through a processing chamber into which a nozzle opens for introducing oxygen-bearing gas, or fuel gas and oxygen-bearing gas.

10. An apparatus according to claim 9, comprising means for connecting the processing chamber to the waste gas conduit.

* * * * *